United States Patent [19]

Rave

[11] Patent Number: 4,502,862
[45] Date of Patent: Mar. 5, 1985

[54] CATIONIC POLYAZO DYESTUFFS, THEIR STABLE SOLUTIONS, THEIR PREPARATION, AND THEIR USE

[75] Inventor: Roderich Rave, Leverkusen, Fed. Rep. of Germany

[73] Assignee: Bayer Aktiengesellschaft, Leverkusen, Fed. Rep. of Germany

[21] Appl. No.: 571,011

[22] Filed: Jan. 16, 1984

[30] Foreign Application Priority Data

Feb. 3, 1983 [DE] Fed. Rep. of Germany ....... 3303512

[51] Int. Cl.$^3$ .................. C09B 44/04; D06P 1/08; D06P 3/32
[52] U.S. Cl. .................................. 8/437; 8/539; 8/639; 8/644; 8/919; 8/687; 534/677; 534/829
[58] Field of Search .................. 260/186; 8/437, 539, 8/687

[56] References Cited

U.S. PATENT DOCUMENTS 2,022,606  11/1935  Smith ............................... 260/177
3,346,322  10/1967  Finkenauer et al. ................ 8/576
4,400,321   8/1983  Linhart et al. .................... 260/186

FOREIGN PATENT DOCUMENTS 36553  9/1981  European Pat. Off. .

Primary Examiner—A. Lionel Clingman
Attorney, Agent, or Firm—Sprung, Horn, Kramer & Wood

[57] ABSTRACT

Cationic polyazo dyestuffs which can be obtained by reacting diaminobenzene derivatives of the general formula

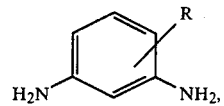

wherein
R represents hydrogen, $C_1$- to $C_4$-alkyl, $C_1$- to $C_4$-alkoxy or halogen, if appropriate in a mixture with up to 30% of aromatic monoamines of the formula

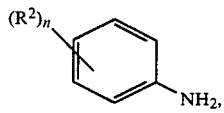

wherein
$R^2$ represents hydrogen, $C_1$- to $C_4$-alkyl, $C_1$- to $C_4$-alkoxy, halogen or $C_1$- to $C_4$-acylamino and n represents 1 to 3, with 0.5 to 0.75 mole of a salt or ester of nitrous acid per mole of diamine and then with 1 to 4 moles of an alkylene oxide of the formula

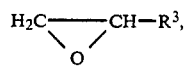

wherein
$R^3$ represents hydrogen or an optionally hydroxyl-, alkoxy- or halogen-substituted $C_1$- to $C_4$-alkyl radical, are used—preferably in the form of their solutions—for dyeing paper, leather and anionically modified synthetic fibres.

10 Claims, No Drawings

CATIONIC POLYAZO DYESTUFFS, THEIR STABLE SOLUTIONS, THEIR PREPARATION, AND THEIR USE

The invention relates to cationic polyazo dyestuffs which can be obtained by reacting diaminobenzene derivatives of the general formula

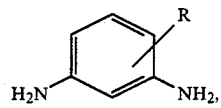

wherein
R represents hydrogen, $C_1$- to $C_4$-alkyl, $C_1$- to $C_4$-alkoxy or halogen,
if appropriate in a mixture with up to 30% of aromatic monoamines of the formula

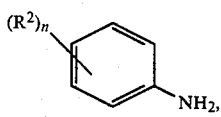

wherein
$R^2$ represents hydrogen, $C_1$- to $C_4$-alkyl, $C_1$- to $C_4$-alkoxy, halogen- or $C_1$- to $C_4$-acylamino and n represents 1 to 3,
with 0.5 to 0.75 mole of a salt or ester of nitrous acid per mole of diamine and then with 1 to 4 moles of an alkylene oxide of the formula

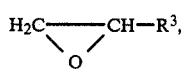

wherein
$R^3$ represents hydrogen or an optionally hydroxyl-, alkoxy- or halogen-substituted $C_1$- to $C_4$-alkyl radical,
to their stable, ready-to-use solutions, to their preparation, and to their use.

Dyestuffs which can be obtained from the diamines I by nitrosation and coupling are complex mixtures whose main constituents are customarily described as tetraminobisazo dyestuffs of the formula IV (with $R^1$=hydrogen) (compare Colour Index Nos. 21,000 and 21,010).

The new dyestuffs will accordingly have in the main the formula

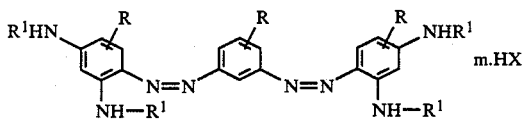

in which
R has the abovementioned meaning,
$R^1$ represents hydrogen or the radical

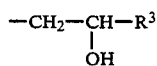

in which
$R^3$ has the abovementioned meaning, and
$R^1$ differs at least once from hydrogen,
and wherein
HX represents an aliphatic carboxylic acid which has 1 to 4 C atoms and which can optionally be substituted by halogen, hydroxyl or alkoxy, or a mixture of these carboxylic acids with inorganic acids, and m designates 2 to 10.

The preparation of cationic polyazo dyestuffs by reacting a hydrochloric acid solution of m-phenylenediamine with sodium nitrite has been known for a long time. This reaction is accompanied by the evolution of nitrogen to form weekly basic compounds and also, as a side reaction, the coupling to give higher molecular weight insoluble dyestuffs (E. Täuber and F. Walder, B.30, 2111, 2899; B.33, 2897). The formation of higher molecular weight products can be avoided by coupling in the presence of large amounts of sodium chloride (U.S. Pat. No. 2,022,606).

European Patent Specification Nos. A 0,036,553 and A 0,045,840 disclose the direct preparation of ready-to-use solutions of these cationic polyazo dyestuffs. The direct preparation involves reacting aromatic diamines, if appropriate in a mixture with up to 30% of aromatic monoamines, in aliphatic carboxylic acids with a salt or ester of nitrous acid. Solutions of this type have the disadvantage that on prolonged storage, more rapidly at elevated temperatures, they form relatively highly condensed products which are no longer water-soluble. The shelf life of these solutions is accordingly inadequate, and the colour strength of these solutions decreases after some time. A further disadvantage of the known processes is that they are restricted to using carboxylic acids, since the presence of inorganic mineral acids leads to the formation of sparingly soluble dyestuff salts which precipitate from the solution. The salts of inorganic acids, however, have a longer shelf life.

It has now been found that the new process produces ready-to-use solutions which have high dyestuff concentrations and which are stable on storage even in the presence of inorganic acids.

The concentrations are preferably between 10 and 40% by weight.

To prepare the new dyestuffs, the mixtures containing dyestuffs IV (with $R^1$=hydrogen) are dissolved or suspended in an aliphatic carboxylic acid, if appropriate in the presence of an inorganic acid, and are then reacted with epoxides III. The dyestuffs IV (with $R^1$=hydrogen) or their solutions can be prepared by known methods, for example as described in Ullmanns Encyklopädie der technischen Chemie [Ullmann's Encyclopaedia of Industrial Chemistry], 4th Edition, Volume XIII, page 574, and European Patent Specification Nos. A 0,036,553 and A 0,045,840.

Preference is given to a single-vessel process in which the diamines I, if appropriate in a mixture with the monoamines II, in aliphatic carboxylic acids which have 1 to 4 C atoms and which can be substituted by halogen, hydroxyl or alkoxy, for example methoxy or ethoxy, are reacted in the absence or presence of inorganic acids, with salts or esters of nitrous acid, and the resulting solutions or suspensions are treated with the epoxides III without intermediate isolation.

The diazotisation takes place at $-10°$ to $+20°$ C. A solution is formed in carboxylic acids, while a dyestuff suspension is obtained in the presence of hydrochloric acid. The alkylene oxide is then allowed to flow in at a temperature of 20°–100° C., and it immediately reacts with the dyestuff. In the course of the reaction, the suspension of the chloride becomes a solution. The resulting solutions of cationic polyazo dyestuffs do not precipitate insoluble compounds even on heating to 80° C. or higher.

The hue of the dyeings can be shaded as desired by mixed coupling with the aromatic monoamines II. If aniline is used the hues obtained are yellower, while p-toluidine, p-anisidine and p-phenetidine produce redder hues.

Examples of suitable aliphatic carboxylic acids are formic acid, acetic acid, propionic acid, 2-chloropropionic acid, glycollic acid, ethoxyacetic acid, monochloroacetic acid, dichloroacetic acid, trichloroacetic acid and lactic acid; acetic acid is preferably used.

Hydrochloric acid is a preferred inorganic acid.

The solutions can also contain additions of organic solvents, for example ethylene glycol, propylene glycol, ethylene glycol monomethyl ether, ethylene glycol monoethyl ether, ethylene glycol monobutyl ether, methylglycol acetate, ethylglycol acetate, glycol diacetate, monoacetine, triacetine, hydroxypropionitrile, urea, dimethylurea, tetramethylurea, thiourea, tetramethylene sulphone, pyrrolidone, N-methylpyrrolidone, ethylene carbonate, propylene carbonate, caprolactam, dimethylformamide, butyrolactone, methanol, ethanol, propanol and isopropanol.

This further improves the cold stability of the solutions. The dyestuff solutions preferably contain 5–30% by weight of the abovementioned solvents.

Since they are derivatives of nitrous acid suitable examples are the alkaline metal salts, in particular sodium nitrite, and esters, such as propylene glycol dinitrite, dipropylene glycol dinitrite or neopentylglycol dinitrite.

In the formula I, R preferably represents hydrogen, methyl, methoxy, ethoxy or chlorine.

Examples of suitable diamines of the general formula I are 1,3-diaminobenzene, 2,4-diaminotoluene, 2,6-diaminotoluene, 2,4-diaminoanisole and mixtures of these diamines in any molar ratio and, in minor amounts, 1,2-diaminobenzene and 1,4-diaminobenzene.

Examples of suitable aromatic monoamines of the general formula II are aniline, 2-toluidine, 3-toluidine, 4-toluidine, 4-amino-1,3-dimethylbenzene, 2-anisidine, 3-anisidine, 4-anisidine, 2-phenetidine, 4-phenetidine, 2-(4-aminophenoxy)-ethanol, 2-chloroaniline, 3-chloroaniline, 4-chloroaniline, 2,4-dichloroaniline and 4-aminoacetanilide.

Examples of suitable alkylene oxides of the formula III are ethylene oxide, propylene oxide, butylene oxide, epichlorohydrin, methoxypropylene oxide, ethoxypropylene oxide and butoxypropylene oxide.

The new dyestuffs are suitable for dyeing paper, in particular waste paper, or leather and for dyeing anionically modified fibres, for example acrylonitrile polymers. By mixing them with other dyestuffs, in particular diaminotriphenylmethane and triaminotriphenylmethane dyestuffs, it is possible to prepare stable solutions which dye paper black.

EXAMPLE 1

97 g of 1,3-diaminobenzene, 110 g of 2,4-diaminotoluene and 21.4 g of 3-aminotoluene are stirred together with 500 ml of glacial acetic acid, 100 ml of water and 100 ml of concentrated hydrochloric acid. In the course of the stirring the temperature rises to 40° C. The solution is cooled down to 0° C., and a solution of 88 g of sodium nitrite in 300 ml of water is added dropwise underneath the surface at 0°–5° C. in the course of about 30 minutes. The reaction mixture is then stirred at room temperature for 1 hour, is heated to 60° C., and 133 g of propylene oxide are then added dropwise to the suspension. The dyestuff goes into solution even as the dropwise addition is taking place. The solution is stirred at 80° C. for 1 hour, is cooled down to room temperature with its dark brown colour, and is filtered with suction. No residue remains on the filter. Mechanical wood pulp paper is dyed a reddish-tinged brown.

$\lambda_{max} = 460$ nm.

EXAMPLE 2

97 g of 1,3-diaminobenzene, 110 g of 2,4-diaminotoluene and 21.4 g of 3-aminotoluene are dissolved in 600 ml of glacial acetic acid, and the solution is cooled down to 0°–5° C. and has added to it in dropwise fashion underneath the surface a solution of 88 g of sodium nitrite in 174 ml of water. The reaction mixture is stirred at room temperature for 1 hour, is then heated to 60° C. and has 150 g of propylene oxide added dropwise in the course of 1 hour. The temperature rises to 70°–72° C. before falling back. The reaction mixture is then heated to 100° C. and is stirred on a boiling waterbath for 3 hours. The solution is cooled down to room temperature and then filtered with suction; no residue remains on the filter. Mechanical wood pulp paper is dyed a reddish-tinged brown.

$\lambda_{max} = 455$ nm.

EXAMPLE 3

220 g of 2,4-diaminotoluene are dissolved at 50°–60° C. in 700 ml of glacial acetic acid. When the solution has cooled down to room temperature 21.4 g of 3-aminotoluene are added, the mixture is cooled down to 0° C., and a solution of 88 g of sodium nitrite in 300 ml of water is added dropwise underneath the surface at 0°–5° C. in the course of 2.5 hours. 200 g of this solution have added to them 20 g of propylene oxide, and the mixture is stirred at 100° C. for 3 hours. The solution is cooled down to room temperature and is then filtered with suction; no residue remains on the filter. Mechanical wood pulp paper is dyed a yellowish-tinged brown.

$\lambda_{max} = 458$ nm.

EXAMPLE 4

244 g of 2,4-diaminotoluene are dissolved at 50°–60° C. in 700 ml of glacial acetic acid, the solution is cooled down to 0° C., and a solution of 88 g of sodium nitrite in 300 ml of water is added dropwise underneath the surface at 0°–5° C. in the course of 2.5 hours. The reaction mixture is stirred at room temperature for several hours, and 200 g of it are then reacted with 20 g of propylene oxide. The solution is stirred at 100° C. for 3 hours, is cooled down and filtered with suction.

$\lambda_{max} = 460$ nm.

EXAMPLE 5

22 g of 2,4-diaminotoluene and 2.14 g of 3-aminotoluene are heated to 55° C. together with 60 ml of glacial acetic acid and 10 ml of concentrated hydrochloric acid, and the suspension is cooled down to 0° C. A solution of 8.8 g of sodium nitrite in 30 ml of water is then added dropwise underneath the surface at 0°–5° C. in the course of 25 minutes, and the reaction mixture is stirred at room temperature for 1 hour, is then heated to 60° C. and has added to it in dropwise fashion 13.3 g of propylene oxide, the temperature is raised to 80° C. for 1 hour, and the solution is filtered with suction. Mechanical wood pulp paper is dyed a yellowish-tinged brown.

$\lambda_{max}$=488 nm.

EXAMPLE 6

24.4 g of 2,4-diaminotoluene are stirred together with 50 ml of glacial acetic acid, 10 ml of water and 10 ml of concentrated hydrochloric acid, during which the temperature rises to 38° C. before falling back. The solution is cooled down to 0° C., and a solution of 8.8 g of sodium nitrite in 30 ml of water is added dropwise underneath the surface at 0°-5° C. in the course of 20 minutes. Stirring for 1 hour at room temperature produces a suspension of the polyazo dyestuff. The suspension is heated to 40° C., and 13.3 g of propylene oxide are added dropwise. The mixture is then stirred at 50° C. for 1 hour, during which a dyestuff solution forms, and is cooled down to room temperature before being filtered with suction; no residue remains on the filter.

$\lambda_{max}$=444 nm.

EXAMPLE 7

22 g of 2,4-diaminotoluene and 1.9 g of aniline are dissolved in 60 ml of glacial acetic acid and 10 ml of concentrated hydrochloric acid at 40° C., and the solution is cooled down to room temperature. The suspension of the amines has added to it in dropwise fashion underneath the surface at 0°-5° C. a solution of 8.8 g of sodium nitrite in 30 ml of water. The reaction mixture is stirred at room temperature for 1 hour, is heated to 60° C. and has added to it in dropwise fashion 13.3 g of propylene oxide. Stirring for 1 hour at 80° C. dissolves all of the dyestuff. The solution is cooled down to room temperature and is filtered with suction. It dyes mechanical wood pulp paper in a yellowish-tinged brown.

$\lambda_{max}$=452 nm.

If 1.9 g of aniline are replaced by 2.6 g od 2-chloroaniline, 3-chloroaniline or 4-chloroaniline and the procedure used is otherwise the same, this likewise gives dyestuff solutions which dye mechanical wood pulp paper in a yellowish tinged brown.

$\lambda_{max}$ of the 3 dyestuffs=450, 448, 452 nm.

EXAMPLE 8

11.0 g of 2,4-diaminotoluene, 9.7 g of 1,3-diaminobenzene and 2.2 g of 2-aminotoluene are dissolved in 70 ml of glacial acetic acid at 30° C. The solution is cooled down to 0° C. and has added to it underneath the surface in dropwise fashion at 0°-5° C. in the course of 20 minutes a solution of 8.8 g of sodium nitrite in 30 ml of water. The reaction mixture is then stirred at room temperature for 1 hour, is heated to 60° C. and has added to it in dropwise fashion 13.3 g of propylene oxide. The dyestuff solution is stirred on a boiling waterbath for 3 hours, is cooled down to room temperature and is filtered with suction. Mechanical wood pulp paper is dyed a reddish-tinged brown.

$\lambda_{max}$=458 nm.

If 2.2 g of o-toluidine in the above example are replaced by the same amount of p-toluidine and the procedure used is otherwise the same, this likewise gives a dyestuff solution which dyes mechanical wood pulp paper a reddish-tinged brown.

$\lambda_{max}$=460 nm.

EXAMPLE 9

220 g of 2,4-diaminotoluene and 21.4 g of 3-aminotoluene are stirred together with 700 ml of glacial acetic acid and cooled down to 0° C. A solution of 88 g of sodium nitrite in 300 ml of water is then added dropwise underneath the surface at 0°-5° C. in the course of about 2.5 hours. The mixture is stirred at room temperature for several hours, and the dyestuff solution is then introduced into an autoclave and reacted with 150 g of ethylene oxide. The solution is stirred at 100° C. for 3 hours, is cooled down and is filtered with suction to give a dyestuff solution which dyes mechanical wood pulp paper in a violet brown.

$\lambda_{max}$=464 nm.

EXAMPLE 10

22 g of 2,4-diaminotoluene and 2.4 g of 2-amino-1,4-dimethylbenzene are dissolved in 60 ml of glacial acetic acid and 10 ml of concentrated hydrochloric acid at 40° C., and the solution is cooled down to room temperature. A solution of 8.8 g of sodium nitrite in 30 ml of water is added at 0°-5° C. to the suspension of crystals. The resulting suspension of the polyazo dyestuff is heated to 50° C., 13.3 g of propylene oxide are then added dropwise, and the reaction mixture is stirred at 80° C. for 1 hour, during which the dyestuff goes into solution. The solution is cooled down to room temperature and is then filtered with suction. Mechanical wood pulp paper is dyed a yellowish-tinged brown.

$\lambda_{max}$=454 nm.

If the 2.4 g of 2-amino-1,4-dimethylbenzene are replaced by the same amount of 4-amino-1,2-dimethylbenzene and the procedure used is otherwise the same, this likewise gives a stable dyestuff solution which dyes mechanical wood pulp paper in a reddish-tinged brown.

$\lambda_{max}$=460 nm.

EXAMPLE 11

11.0 g of 2,4-diaminotoluene, 9.7 g of 1,3-diaminobenzene and 3.5 g of 4-aminoacetanilide are stirred together with 60 ml of glacial acetic acid and 10 ml of concentrated hydrochloric acid and cooled down to 0° C. A solution of 8.8 g of sodium nitrite in 30 ml of water is added dropwise underneath the surface at 0°-5° C., and the mixture is stirred at room temperature for 1 hour. The reaction mixture is then heated to 60° C., has 13.3 g of propylene oxide added to it in dropwise fashion, and is then stirred at 80° C. for 1 hour. It is cooled down to room temperature and filtered with suction to give a stable dyestuff solution which dyes mechanical wood pulp paper in a reddish-tinged brown.

$\lambda_{max}$=458 nm.

If the 3.5 g of 4-aminoacetanilide in the above procedure are replaced by 2.5 g of o-anisidine, m-anisidine or p-anisidine or 2.8 g of p-phenetidine and the procedure is otherwise the same, this likewise gives stable dyestuff solutions which dye mechanical wood pulp paper in a reddish-tinged brown.

$\lambda_{max}$ of the 4 dyestuffs=460, 458, 458, 460 nm.

EXAMPLE 12

11.0 g of 2,4-diaminotoluene, 9.7 g of 1,3-diaminobenzene and 2.14 g of 3-aminotoluene are dissolved in 70 ml of propionic acid, the solution is cooled down to 0° C., and a solution of 8.8 g of sodium nitrite in 30 ml of water is added dropwise underneath the surface at 0°-5° C. in the course of 30 minutes. The mixture is stirred at room temperature for 1 hour, is heated to 60° C. and has 13.3 g of propylene oxide added to it in dropwise fashion at this temperature. Following stirring for 3 hours on a boiling waterbath, the solution is cooled down to room temperature and filtered. Mechanical wood pulp paper is dyed a reddish-tinged brown.

$\lambda_{max}=500$ nm.

EXAMPLE 13

24.4 g of 2,4-diaminotoluene are dissolved at 35° C. in 70 ml of lactic acid. The solution is cooled down to 0° C., and a solution of 8.8 g of sodium nitrite in 30 ml of water is added dropwise underneath the surface at 0°-5° C. in the course of 20 minutes. The mixture is stirred at room temperature for 1 hour, is heated to 60° C. and has added to it in dropwise fashion 13.3 g of propylene oxide. Following stirring for 3 hours on a boiling waterbath, the solution is cooled down to room temperature and filtered. Mechanical wood pulp paper is dyed a reddish-tinged brown.

$\lambda_{max}=460$ nm.

EXAMPLE 14

22 g of 2,4-diaminotoluene and 2.14 g of 3-aminotoluene are heated to 60° C. together with 70 ml of ethoxyacetic acid, and a solution forms. On cooling down to 0° C., the solution changes to a suspension of crystals to which a solution of 8.8 g of sodium nitrite in 30 ml of water is added dropwise underneath the surface at 0°-5° C. in the course of 20 minutes. The reaction mixture is stirred at room temperature for 1 hour, is heated to 60° C. and has added to it in dropwise fashion 13.3 g of propylene oxide. The solution is heated on a boiling waterbath for 3 hours, is then cooled down to room temperature and is filtered. Mechanical wood pulp paper is dyed a yellowish-tinged brown.

$\lambda_{max}=452$ nm.

EXAMPLE 15

11 g of 2,4-diaminotoluene, 9.7 g of 1,3-diaminobenzene and 2.14 of 3-aminotoluene are dissolved in 70 ml of glacial acetic acid at 30° C. After cooling down to 0° C., the solution has added to it underneath the surface in dropwise fashion at 0°-5° C. in the course of 20 minutes a solution of 8.8 g of sodium nitrite in 30 ml of water. The reaction mixture is stirred at room temperature for 1 hour and is then heated to 60° C. 16 g of butylene oxide are then added dropwise, and the reaction mixture is heated on a boiling waterbath for 3 hours. On cooling down to room temperature the solution is filtered. Mechanical wood pulp paper is dyed a reddish-tinged brown.

$\lambda_{max}=460$ nm.

EXAMPLE 16

108 g of a technical mixture of diaminobenzene isomers which consists to 88% of 1,3-diaminobenzene, to 10% of 1,2-diaminobenzene and to 2% of 1,4-diaminobenzene are stirred together with 175 ml of glacial acetic acid and 50 ml of concentrated hydrochloric acid. The temperature rises to 48° C. before falling back, and a suspension of the chlorides forms. The suspension is cooled down to 0° C. and has added to it underneath the surface in dropwise fashion at 0°-5° C. in 1.5 hours a solution of 44 g of sodium nitrite in 75 ml of water. The suspension of polyazo dyestuffs is stirred at room temperature for 1 hour, is then heated to 60° C. and has added to it in dropwise fashion at 60°-74° C. in the course of 1 hour 133 g of propylene oxide. The reaction mixture is raised to 80° C. and is stirred at this temperature for 1 hour. The solution which is now formed is cooled down to room temperature and filtered. No residue remains on the filter. The solution dyes mechanical wood pulp paper in a reddish-tinged brown.

$\lambda_{max}=460$ nm.

32.5 g of this solution are stirred at 50° C. for 1 hour together with 7.3 g of methyl violet, 2.2 g of the malachite green carbinol base, 28 g of acetic acid and 30 g of water to give a dyestuff mixture which dyes mechanical wood pulp paper black.

If the 50 ml of concentrated hydrochloric acid in the above example are replaced by an equivalent amount of sulphuric acid, phosphoric acid or nitric acid and the procedure used is otherwise the same, this likewise gives a stable dyestuff solution.

$\lambda_{max}=460$ nm.

EXAMPLE 17

24.4 g of 2,4-diaminotoluene are dissolved in 70 ml of glacial acetic acid at 30° C., and the solution is cooled down to 0° C. A solution of 8.8 g of sodium nitrite in 30 ml of water is added dropwise underneath the surface at 0°-5° C. in the course of 20 minutes. The reaction mixture is stirred at room temperature for 1 hour, is heated to 60° C. and then has added to it in dropwise fashion 14 g of epichlorohydrin. The solution is stirred on a boiling waterbath for 3 hours and is then cooled down and filtered with suction. Mechanical wood pulp paper is dyed a reddish-tinged brown.

$\lambda_{max}=466$ nm.

EXAMPLE 18

21.6 g of 1,3-diaminobenzene are dissolved in 50 ml of glacial acetic acid, 10 ml of concentrated hydrochloric acid and 10 ml of water at about 40° C. The solution is then cooled down to 0° C., and a solution of 8.8 g of sodium nitrite in 30 ml of water is added dropwise underneath the surface at this temperature. The dyestuff suspension is stirred at room temperature for 1 hour and then has added to it in dropwise fashion 13.0 g of propylene oxide. in the course of the addition the dyestuff which has crystallised out goes into solution. The reaction mixture is stirred at 80° C. for 1 hour, is cooled down to room temperature, and is filtered with suction. Mechanical wood pulp paper is dyed in a slightly reddish-tinged brown.

$\lambda_{max}=460$ nm.

EXAMPLE 19

30 g of caprolactam and 122 g of an amine mixture of 65% 2,4-diaminotoluene and 35% 2,6-diaminotoluene are dissolved at 68° C. in 255 g of glacial acetic acid and 40 g of concentrated hydrochloric acid. On cooling down to 0° C., the chlorides of the diamines precipitate. 46 g of sodium nitrite are then added, and 45 ml of water are added dropwise at 0°-10° C. in the course of 3 hours. The mixture is then stirred with cooling for 1 hour and at room temperature for several hours, during which a crystal suspension of cationic polyazo dyestuffs forms. The suspension is heated to 60° C., and 54 g of propylene oxide are added dropwise. Three hours heating at 100° C. produces a solution which remains stable even on cooling down to room temperature. Mechanical wood pulp paper is dyed a reddish-tinged brown.

$\lambda_{max}=464$ nm.

EXAMPLE 20

28.5 g of a mixture of 2,4- and 2,6-diaminotoluenes (mixing ratio: ⅔) and 25 g of m-phenylenediamine are dissolved in 1200 ml of water at room temperature, and 67 ml of sodium nitrite solution (30 g/100 ml) are added. Following addition of 450 g of sodium chloride and 800 g of ice, a temperature of $-10°$ C. to $-12°$ C. being established, 86 ml of concentrated hydrochloric acid are allowed to flow in fast. Dilute sodium acetate solution is then added to raise the pH from 3.5. Some hours later the coupling solution is brought to pH 1, and the precipitated dyestuff is filtered off with suction. The moist paste is suspended in 300 g of glacial acetic acid, the suspension is heated to 60° C., and 130 g of propylene oxide are then added dropwise. Heating at 80° C. for 3 hours produces a solution which dyes mechanical wood pulp paper in a reddish-tinged brown.

$\lambda_{max} = 460$ nm.

I claim:

1. A cationic polyazo dyestuff of the formula

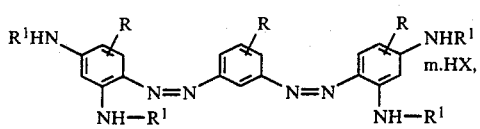

in which

R represents hydrogen $C_1$–$C_4$-alkyl, $C_1$–$C_4$-alkoxy or halogen, $R^1$ represents hydrogen or the radical

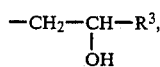

at least one $R^1$ representing

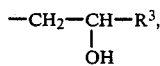

$R^3$ represents hydrogen, or an optionally hydroxyl-, alkoxy- or halogen-substituted $C_1$–$C_4$-alkyl radical, HX represents an aliphatic carboxylic acid which has 1 to 4 C atoms and which can optionally be substituted by halogen, hydroxyl or alkoxy, or a mixture of these carboxylic acids with inorganic acids, and m designates 2 to 10.

2. A process for preparing a cationic polyazo dyestuff according to claim 1, comprising reacting diaminobenzene of the formula

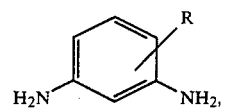

with 0.5 to 0.75 mole of a salt or ester of nitrous acid per mole of diamine and then with 1 to 4 moles of an alkylene oxide of the formula

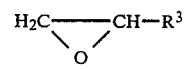

3. A process according to claim 2, wherein the diaminobenzene is mixed with up to 30% of an aromatic monoamine of the formula

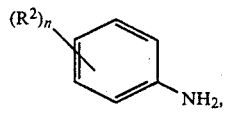

4. A process according to claim 2, wherein the reaction with the alkylene oxide is carried out in an aliphatic carboxylic acid.

5. A process according to claim 4, wherein the reaction with the salt or ester of nitrous acid is also carried out in an aliphatic carboxylic acid.

6. A process according to claim 5, wherein the two reactions are carried out without intermediate isolation and the aliphatic carboxylic acid has 1 to 4 carbon atoms and is optionally substituted by halogen, hydroxyl or alkoxy.

7. A process according to claim 4, wherein the reaction with the salt or ester of nitrous acid is carried out at $-10°$ to $+30°$ C. and that with the alkylene oxide at 20°–100° C.

8. A solution of a dyestuff according to claim 1.

9. A solution according to claim 8, further containing a diaminotriarylmethane or triaminotriarylmethane dyestuff.

10. In the process of dyeing of paper, leather or an anionically modified fiber, the improvement which comprises employing as the dyestuff a dyestuff according to claim 1.

* * * * *